United States Patent [19]
Johnston

[11] 4,267,971
[45] May 19, 1981

[54] METHOD AND MEANS OF PRESETTING THE OUTPUT RATE OF A CENTRIFUGAL PUMP AGRICULTURAL METERING SYSTEM

[75] Inventor: Douglas Johnston, Decatur, Ala.

[73] Assignee: John Blue Company, New York, N.Y.

[21] Appl. No.: 40,309

[22] Filed: May 18, 1979

Related U.S. Application Data

[63] Continuation-in-part of Ser. No. 946,048, Sep. 26, 1978, abandoned.

[51] Int. Cl.³ .............................................. B05B 9/06
[52] U.S. Cl. ..................................... 239/11; 239/172
[58] Field of Search ................ 239/1, 11, 67, 71, 127, 239/155, 172, 574; 137/624.11, 624.12

[56] References Cited
U.S. PATENT DOCUMENTS

| | | | |
|---|---|---|---|
| 3,361,354 | 1/1968 | Johnston | 239/11 |
| 3,361,357 | 1/1968 | Johnston | 239/127 |
| 3,784,100 | 1/1974 | Kirschmann | 239/11 |
| 3,843,056 | 10/1974 | Nye | 239/64 |
| 4,052,003 | 10/1977 | Steffen | 239/155 X |

OTHER PUBLICATIONS

Blue Catalog, "Liquid Fertilizer Equipment", Form 12T12 1174.

Primary Examiner—Robert B. Reeves
Assistant Examiner—Gene A. Church
Attorney, Agent, or Firm—Cushman, Darby & Cushman

[57] ABSTRACT

A system and method for metering the application of liquid agricultural chemicals to the soil from a moving vehicle at a substantially constant preselected application rate, e.g. gallons per acre, substantially independent of vehicle speed. The system uses a centrifugal pump driven at a rate substantially linearly proportional to vehicle speed and having its outlet pressure substantially proportional to the square of its speed. The pump receives liquid from a supply tank and delivers it to liquid discharge orifice means the rate of flow through which is substantially proportional to the square root of the pressure thereon. The system also includes a line having adjustable orifice means therein controllable by the vehicle driver while the vehicle is moving for returning a portion of pump delivery liquid to the tank and controlling upstream pressure. Orifice pressure Pn required to achieve a preselected application rate at a selected vehicle speed can be determined readily. For each such Pn there is a corresponding calculable, or ascertainable by test, pump system pressure Pc when flow to the discharge orifice means is shut off. A Pc pressure gauge is readable by the driver and also preferably a Pn gauge. Pn is first determined and then the corresponding Pc. The vehicle is moved at the selected speed with the pump being driven and flow to the discharge orifice means shut off while the driver adjusts the adjustable orifice means to preset the Pc corresponding to the determined Pn. Flow to the discharge orifice means can then be started to obtain substantially the preselected application rate at substantially all vehicle speeds.

16 Claims, 4 Drawing Figures

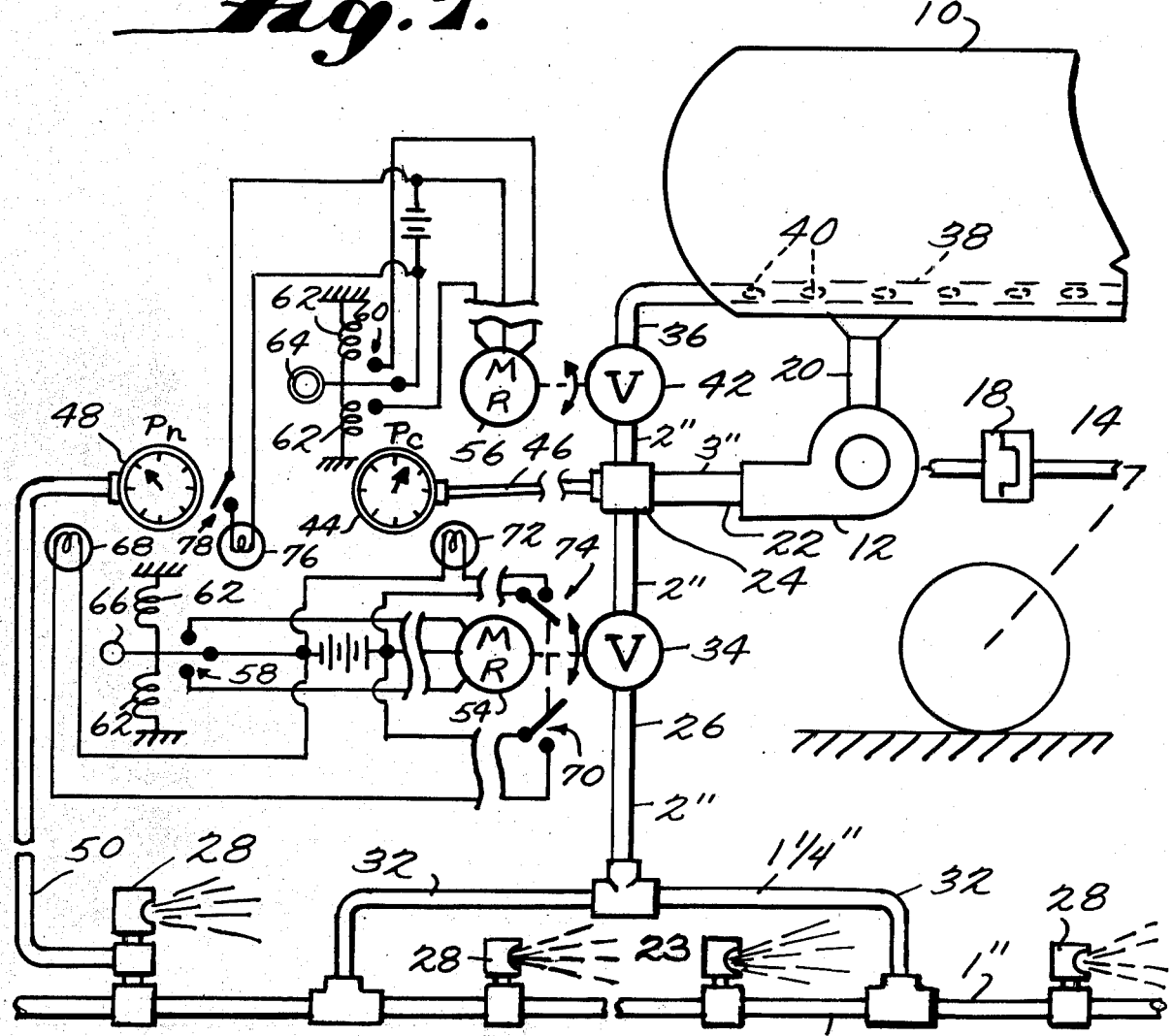
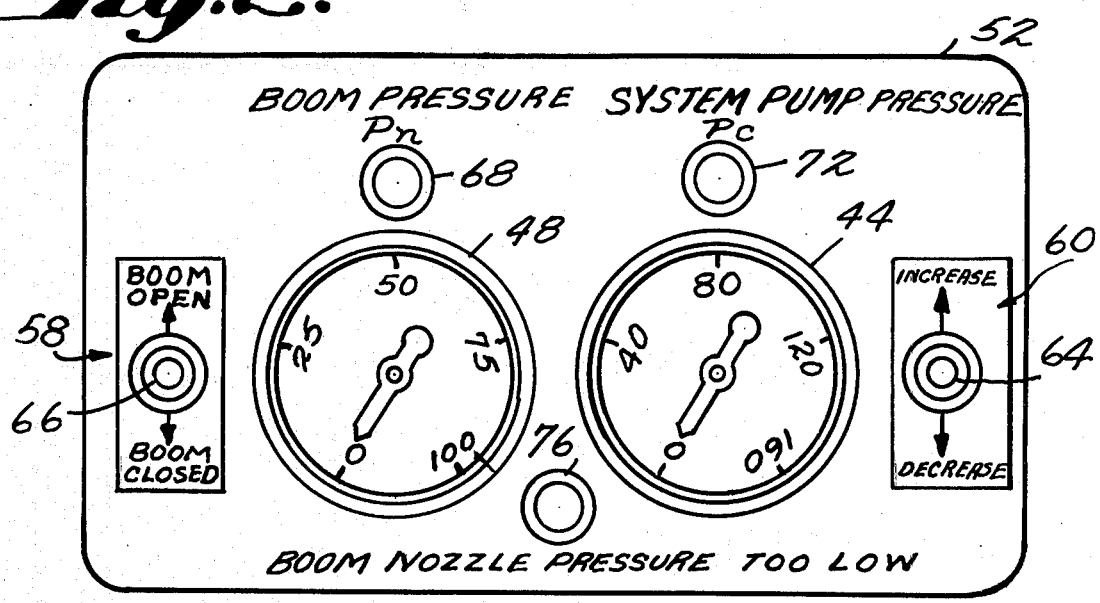

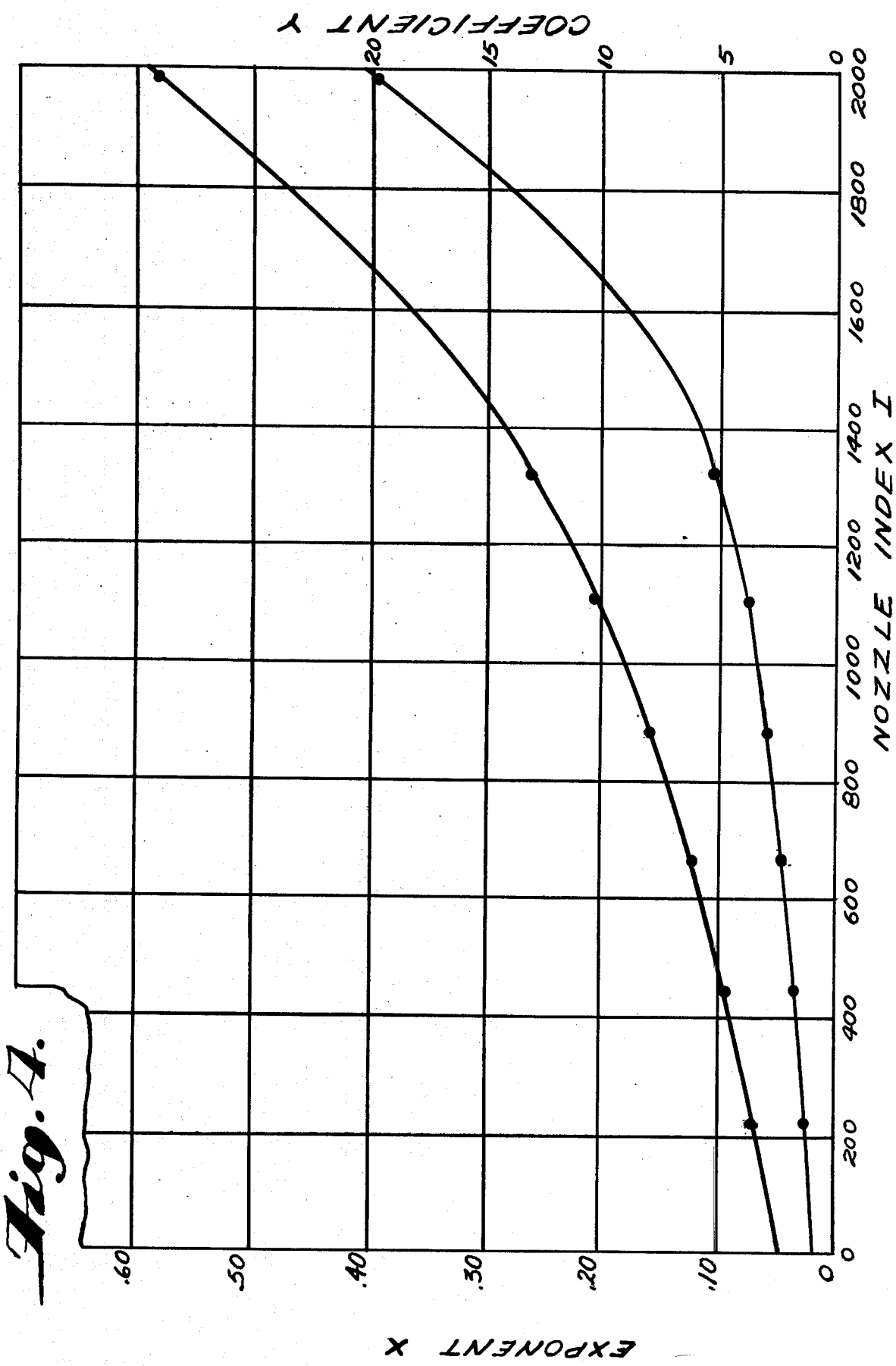

METHOD AND MEANS OF PRESETTING THE OUTPUT RATE OF A CENTRIFUGAL PUMP AGRICULTURAL METERING SYSTEM

This application is a continuation-in-part of my copending application, Ser. No. 946,048, filed Sept. 26, 1978, now abandoned.

This invention relates to the application of liquid agricultural chemicals, e.g. fertilizers, fumigants, herbicides, insecticides, etc., to or into the soil from a moving vehicle. More especially, it relates to a simple method and rugged economical system for accurately metering such application at a substantially constant preselected application rate in terms of amount per unit area, e.g. gallons per acre, substantially irrespective of vehicle speed. Constant vehicle speed is difficult to maintain in irregular or hilly terrains. In accordance with the invention a preselected application rate is preset into the system prior to commencing application in order to avoid application at a wrong rate while adjusting a system to achieve the correct preselected rate.

BACKGROUND OF THE INVENTION

Conventional metering systems for the application of liquid agricultural chemicals have long used positive displacement pumps, usually of the reciprocating variable-stroke type, driven by a ground engaging wheel or other means for driving the pump at a rate linearly proportional to vehicle speed. Such pumps are expensive, however, and their valving is particularly subject to abrasion from chemicals retained in liquid suspension rather than solution. Other disadvantages of using positive displacement pumps for such metering systems are described in U.S. Pat. Nos. 3,361,354 and 3,361,357, the disclosures of which are by reference incorporated herein.

Those patents essentially teach that a centrifugal pump, of the type having output pressure substantially proportional to the square of its speed, can be used for accurate metering with application means having a liquid discharge orifice, the output thereof, i.e. flow rate therethrough in amount per unit of time, being substantially proportional to the square root of the pressure of the liquid supplied thereto. In such a system the application rate, at a given vehicle speed, is set by setting discharge orifice pressure, i.e. upstream of the orifice, usually by adjusting a by-pass valve that returns a portion of pump delivery to a supply tank. Once so set the centrifugal pump metering system will maintain the application rate substantially constant at all other vehicle speeds, i.e. the output of or flow rate through the orifice will be substantially linearly proportional to vehicle ground speed.

The term application means is used herein to include both spray nozzles for surface application and ground penetrating blades or knives for subsurface application, it being understood that both have a discharge orifice, the rate of flow therethrough, in amount per unit of time, being substantially proportional to the square root of the pressure thereon. As taught in the aforesaid patents the pressure developed by certain types of centrifugal pumps varies substantially as the square of their speed (in RPM), so that when such a pump supplies liquid to such an orifice, flow therethrough is substantially linearly proportional to pump speed. U.S. Pat. Nos. 3,361,354 and 3,361,357 also disclose the provision of a calibrated dial liquid return or application means by-pass valve settable to produce the desired application rate by the use of a chart.

Most liquid agricultural chemicals are applied at the present time with large truck applicators having a centrifugal pump distribution system. An example of such truck applicators is the C-2950 Series made by the John Blue Co. of Huntsville, Alabama which are illustrated and described in Blue catalog "Liquid Fertilizer Equipment", Form No. 12T12 1174. The calibrated dial valve metering system is not, however, practical for such truck applicators. The pump usually is driven by a power take off from the truck engine, so that when the truck transmission gears are changed, the ratio of pump speed to vehicle speed is changed. Moreover, the transmission gear ratios, rear end ratios, tire size, and pump drive ratios differ from truck to truck depending on the make, model, size and equipment specified. This would require the preparation of an application rate chart for each particular truck and for each of its transmission gear ratios to be used during application. Further, the accurate determination of pump speed to vehicle speed for each different truck and each of its several transmission gear ratios is practically impossible. Additionally, the chart for the dial valve must be determined by actual flow test for each number and size of discharge orifices at each application rate it is anticipated may be used.

From the foregoing it will be seen that the preparation of application rate charts for truck applicators having calibrated dial valve centrifugal pump metering systems would be entirely too difficult and expensive to be practical.

Still further, the calibrated dial valve must either be installed in the truck cab, requiring extra hose and fittings and the cutting of holes in the cab for the large hose and pipe fittings, or else the valve must be installed outside of the cab requiring the driver to stop the truck and get out to adjust the valve. Neither of these alternatives is acceptable to a truck operator. Additionally, a calibrated dial valve is quite expensive because it must have extreme accuracy and be able to resist corrosion and abrasion from agricultural chemicals.

For the foregoing reasons, although most truck applicators employ a centrifugal pump distribution system, they lack metering accuracy because they are not equipped with a calibrated dial by-pass valve. Most such truck applicators, however, are provided with a return valve for sparging purposes, i.e. agitating and maintaining chemicals in suspension in the supply tank, and sometimes with a gauge for measuring pressure of the liquid supplied to the discharge orifices of the application means. Calculations can be made to determine the pressure with which liquid should be supplied to the discharge orifices at a given speed for a desired application rate. The actual application rate usually is inaccurate, however, because of the difficulty of setting the sparger or return valve manually to give the correct discharge orifice pressure for a given speed. Moreover, in practice an operator usually starts application at the wrong rate while trying to adjust the sparger valve to adjust discharge orifice pressure to achieve the correct preselected rate, almost always applying too much or too little. In fact, orifice pressure may be several hundred percent in error when the discharge valve is opened to commence application. While adjusting the sparger valve to obtain the correct orifice pressure serious over or under application of chemicals can occur. Such a situation is bad enough when applying fertilizer, but disastrous when applying herbicides.

BRIEF SUMMARY OF THE INVENTION

Accordingly, it is an object of this invention to provide a simple method and a rugged economical system for achieving accurate metering with a centrifugal pump to apply liquid agricultural chemicals to the soil from a moving vehicle substantially independent of vehicle speed.

It is another object of this invention to provide such a method and system in which a preselected application rate can be preset easily and conveniently before commencing application.

It is another object of this invention to provide such a method and system which will not necessitate the preparation of a chart for each particular applicator which differs from others in ratio of pump drive to ground speed.

It is another object of this invention to provide such a method and system that is particularly adaptable to truck applicators on which all the application equipment is mounted rather than on a trailed vehicle.

It is a further object of this invention to provide such a method and system controllable by a truck driver-operator from the truck cab and in which the cab metering controls are simple and easily installable.

The foregoing objects are accomplished by the discovery that for a given discharge orifice output or flow rate, and corresponding pressure on the orifice, for a particular centrifugal pump applicator system of the type described in the aforementioned patents, the relation of pump pressure Pc in the system, when the discharge or shut-off valve is closed and no liquid is being applied, to pressure Pn on the discharge orifice during application, is calculable for all flow rates. Orifice pressure Pn necessary to achieve a preselected application rate for a given number, size, and spacing (or swath width) of application means discharge orifices (number×size=nozzle index I) and for a given ground speed, can be calculated easily. From that calculated Pn, the pump pressure Pc with the shut-off or discharge valve closed which will attain the desired discharge orifice pressure Pn when the valve is opened also can be calculated, or determined by actual tests, and charts prepared therefor for various application rates. Thus, an operator can preset a preselected application rate prior to commencing application by closing the discharge valve, moving the vehicle at the given speed, and adjusting a sparger or return valve while observing a pressure gauge connected into the delivery system between that valve and the discharge or shut-off valve until it reads the desired Pc. To commence application at the preselected rate, the operator then has only to open the discharge valve and move the vehicle at any convenient speed. The necessary additional parts for such a system are simple and economical, and they are also simple and easily installable in a truck cab.

Other objects and advantages of the invention will become apparent from the following detailed description and accompanying drawings.

BRIEF DESCRIPTION OF THE DRAWINGS

FIG. 1 is a diagrammatic view of an applicator system embodying this invention.

FIG. 2 is a view of exemplary controls for an applicator system embodying this invention.

FIG. 4 is a graph, derived from FIG. 3, showing the variable coefficient Y and the variable exponent X, both functions of I, plotted against the nozzle index I.

DETAILED DESCRIPTION OF THE INVENTION

Figure 3:
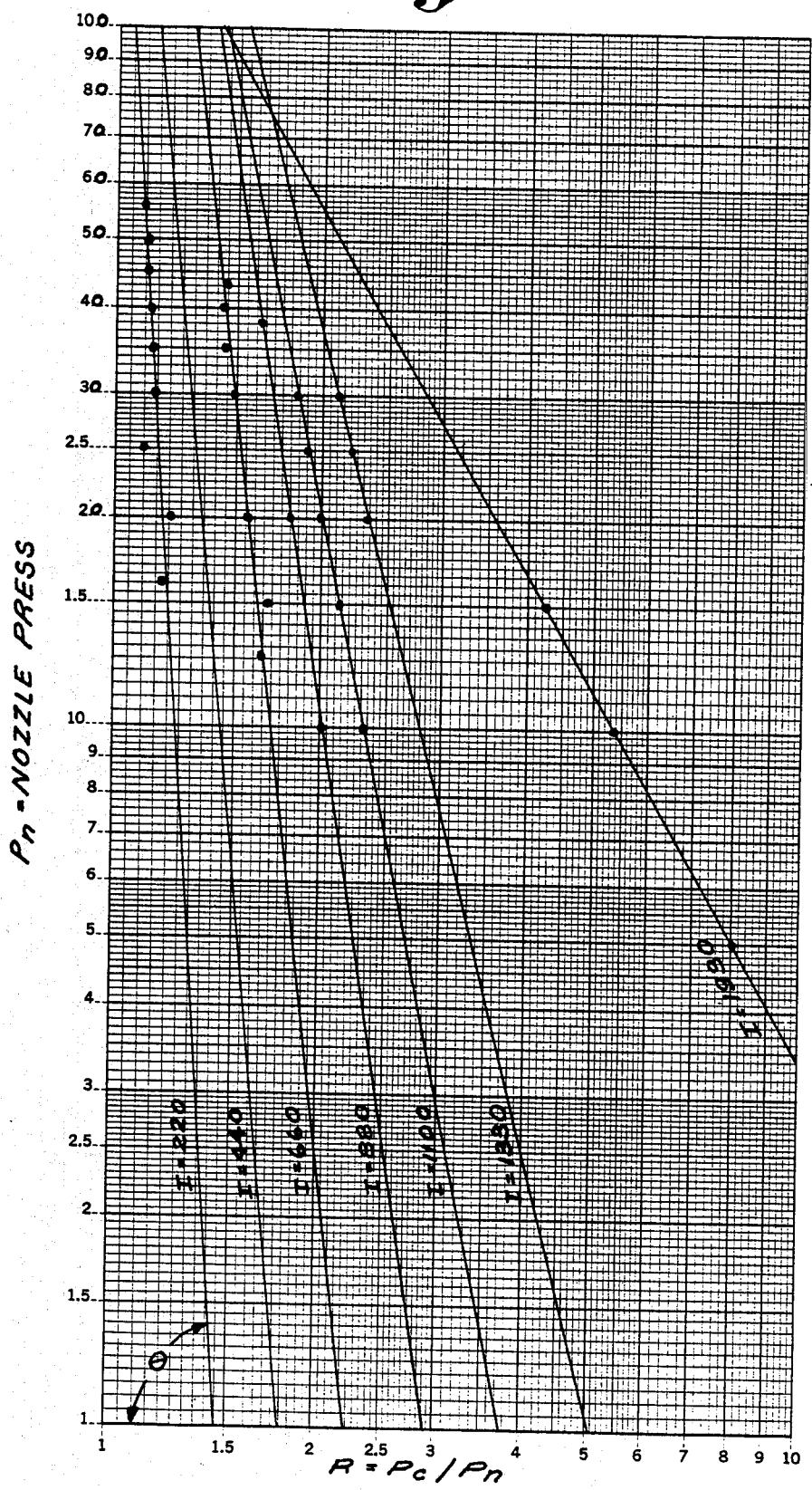
FIG. 3 is a graph of test data showing Pn plotted against Pc/Pn on logarithmic coordinate paper for various nozzle indices I.

Referring now to FIG. 1 of the drawings, a system embodying this invention for applying liquid agricultural chemicals to the soil includes the usual large supply tank 10 for the chemicals carried upon a vehicle (not shown), preferably a truck but possibly a trailer drawn by a tractor or the like. Examples of trailer type applicators also are described and illustrated in the aforementioned Blue catalog. As used herein the term "self-propelled vehicle means" includes both a truck, or other type of self-propelled vehicle per se, and tractor-trailer combinations. The system includes a centrifugal pump 12 of the type having its output pressure substantially proportional to the square or second power, of its speed in RPM. The pump is driven by means, such as a shaft 14, turning at a speed linearly proportional to ground or vehicle speed and, hence, linearly proportional to the speed of a ground-engaging wheel 16 of the vehicle. When mounted on a truck, the drive means for the pump 12 may be a power take-off (not shown) from the truck engine or preferably from the drive shaft (not shown) between the transmission and the driven wheels. If the power take-off is from the engine the preselected application rate will have to be reset into the system each time the transmission gears are changed because such gear change will change the ratio of pump speed to ground speed. In either arrangement it is desirable that the pump drive be disengageable, as by an appropriate clutch 18, so that the pump 12 need not operate when the truck is proceeding to or from an application site. If the pump 12 is mounted on a trailed vehicle it can be driven by an appropriate drive from a ground-engaging wheel, such as the drive disclosed in the aforementioned U.S. Pat. Nos. 3,361,354 and 3,361,357. Again, however, it is preferable that the pump drive be disengageable for the reason set forth above.

The inlet of the pump 12 receives the liquid chemicals from the tank 10 through the usual unobstructed suction line 20 and delivers them to the application means through a pump discharge line 22 connected, as by a T-connection 24, to the usual delivery line 26. As illustrated in the drawings the application means comprises a plurality of spray nozzles 28 located along an above-ground boom 30 connected by distribution lines 32 to the delivery line and positioned at the rear of the vehicle transversely to its direction of travel. The nozzles 28 are each of the same size and each is provided with a discharge orifice of known cross-sectional area. The nozzles 28 are readily exchangeable, however, for other sets of nozzles of a different size. Connected in the delivery line 26 is a remotely-controlled discharge or shut-off valve 34 commonly called a boom valve. As mentioned before, instead of the spray nozzles 28, the application means may be in the form of ground penetrating blades or knives (not shown) of known types supported on a tool bar (not shown) and having discharge orifices associated therewith for sub-surface application.

The discharge line of the pump 12 also is connected, through the T-connection 24, to a return or by-pass line 36 which customarily is used for sparging purposes, i.e. connected to a pipe 38 running along the bottom of the tank 10 and having a plurality of discharge orifices 40 for agitating, and thereby maintaining in suspension, agricultural chemicals suspended in the liquid in the tank. Connected into the sparger line 36 is a remotely-controlled valve 42, commonly called a sparger valve, which is adjustable to vary the flow area therethrough. In a sense, the sparger valve 42 is an adjustable control orifice to vary upstream pressure.

Certain test data, described hereafter, are based upon the pipe or hose sizes for various lines 22, 26, 32, 30 and 36 indicated in FIG. 1 of the drawings, but it is to be understood that such sizes can be varied, as desired, in accordance with good engineering practice.

In order to ascertain pump pressure supplied to the delivery and sparger lines 26 and 36, a pressure gauge 44 is connected, as by a tube 46, to the discharge line 26 or to the T-connection 24 as shown. Preferably, another pressure gauge 48 is connected, as by a tube 50, to the delivery line 26 downstream of the boom valve 34 and preferably just upstream of one of the nozzles 28, as shown, to measure the pressure Pn on the nozzle discharge orifices. Both gauges 44 and 48 are located to be readily readable by the driver-operator of the vehicle means, as in the exemplary control panel 52 shown in FIG. 2 which is adapted to be mounted in the cab of a truck or on a tractor. The valves 34 and 42 may be operated by appropriate remotely-controlled power-operated means such as reversible electric motors, 54 and 56, respectively, having toggle-type switches 58 and 60, respectively, for operating the motors located on the control panel 52 as shown in FIG. 2. Each switch 58 and 60 preferably is loaded, as by springs 62, to a neutral or off position. Switch 60 may be connected to operate the motor 56 to slowly move the adjustable sparging valve 42 toward closed position when the switch handle 64 is moved up and the reverse when the switch handle 64 is moved down. Switch 58 may be connected to operate the motor 54 to open the shut-off or discharge valve 34 when the switch handle 66 is moved up and the reverse when the switch handle 66 is moved down. Preferably, the control panel 52 includes signalling means, such as a green electric lamp 68, located near the Pn gauge 48 and turned on by a limit switch 70 associated with the shut-off valve 34, to indicate when that valve is fully open, and also another signalling means, such as a green electric lamp 72 located near the Pc gauge 44 and turned on by a limit switch 74 associated with the shut-off valve 34, to indicate when that valve is closed. The panel 52 also preferably includes other signalling means, such as a red electric lamp 76, turned on by a pressure switch 78, responsive to the pressure of the Pn gauge 48, whenever nozzle or discharge orifice pressure becomes too low to provide a good spray pattern from the nozzles 28.

As stated heretofore, it is a relatively simple matter to calculate orifice pressure Pn necessary to achieve a preselected application rate for a given number, size and swath width of application means for a given ground speed. Once that pressure Pn has been set for that speed, the application rate remains substantially constant for all other convenient speeds. Further, as stated heretofore, once such orifice pressure Pn has been calculated, it is possible to calculate the pump pressure Pc with the boom valve 34 closed which will, when the boom valve is opened, obtain the desired discharge orifice pressure Pn at the given speed.

There follows an explanation of such calculations, based on test data using a known type of 3" straight centrifugal pump 12 which has the known characteristic that the discharge pressure in p.s.i. is substantially proportional to the square of the speed in RPM, and the discharge rate in gallons per minute is proportional to the speed. An example of such a pump is illustrated on page 14 of the aforementioned Blue catalog. The exemplary calculations also are based upon the use of standard make spray nozzles of different size, i.e. K20 through K180 "Floodjet" nozzles made by Spraying Systems Co. of Bellwood, Illinois, whose literature indicates that the output rate, in gallons per minute, for each nozzle size at 10 p.s.i., is one-tenth the nozzle size, e.g. for nozzle K20 the output rate at 10 p.s.i. is 2 GPM. These nozzles are of the type almost always used for truck applicators.

CALCULATION SYMBOLS

G = Specific gravity of fluid
I = Nozzle index = Number of nozzles × nozzle size
M = Vehicle speed (for setting Pc and Pn) in miles per hour
Qa = Application rate desired in gals. per acre
Qn = Total nozzle flow rate in gals. per minute
Pc = Pump system pressure at T connection, boom valve closed, p.s.i.
Pn = Nozzle orifice pressure, p.s.i.
S = Swath width, inches = number of nozzles × nozzle spacing
R = Ratio of Pc/Pn for given value of Pn and I
R = $Y/Pn^X$, where
Y = A variable coefficient, a function of I, plotted in FIG. 4
X = A variable exponent, a function of I, also plotted in FIG. 4

EQUATIONS—REFER TO FIG. I $$Qn = \frac{Qa \times M \times S}{5940} \quad \text{Well known equation for total nozzle flow rate.} \qquad \text{I}$$

$$Qn = \frac{I}{10}\sqrt{\frac{Pn}{10}} = \frac{I}{31.6}\sqrt{Pn} \qquad \text{II}$$

Characteristic nozzle catalog total flow rate equation.

$$Pn = 2.83 \left( \frac{Qa \times M \times S}{I} \right)^2 \times G \times 10^{-5} \qquad \text{III}$$

From equations I and II.
Pc = R × Pn by symbol definition above.

$$Pc = \left( \frac{Y}{Pn^X} \right) \times (Pn) = Y \times Pn^{(1-X)} \qquad \text{IV}$$

From test results with various nozzle indices I, Pn was plotted against R = Pc/Pn on logarithmic coordinate paper as shown in FIG. 3. Since the tangent of the angle $\theta$ for each I curve is equal to Log Pn/Log R, and since Log R = Log Y − X Log Pn, the exponent X for each I curve is equal to 1/Tan $\theta$. Therefore the exponent X for each I curve was determined from the plot, FIG. 3.

Also, since for a value of $Pn=1$ the equation $R=Y/Pn^X$ becomes $R=Y$, the value of Y is determined simply by reading this value on the bottom scale, where $Pn=1$.

From the plotted test data for this particular system for 11 nozzles of sizes K20, K40, K60, K80, K100, K120, and K180 the coefficient Y and the exponent X were found to be:

| I | X | Y |
|---|---|---|
| 220 | .070 | 1.46 |
| 440 | .096 | 1.82 |
| 660 | .120 | 2.26 |
| 880 | .158 | 2.92 |
| 1100 | .206 | 3.81 |
| 1320 | .257 | 5.09 |
| 1980 | .572 | 19.69 |

In FIG. 4 these values of X and Y are plotted against I, the number of nozzles times the nozzle size.

With the equation $Pc=Y\times Pn^{(1-X)}$ and the plot of X and Y against I, it is a simple matter to construct a slide rule to solve for Pc for any given value of I and Pn. Pn is determined first from equation III above.

If it is desired to solve for Pc with an electronic calculator, instead of a slide rule, equations may be developed for X and Y. In this case the following equations fit the curves fairly well, and more precise ones can be derived:

V  $X = 0.0652 \ I^{0.000145}$
VI $Y = 1.448 \ I^m$
VII where $m = 0.0000037 \ I^{1.5}$ and so
VIII $Pc = 1.448 \ I^m \times Pn^{(1-x)}$ The following example will illustrate how the nozzle pressure Pn and the pump pressure Pc are calculated. Given:

11 K40 nozzles on 60" spacing
$I = 11 \times 40 = 440$
$S = 60 \times 11 = 660$
$M = 10$ m.p.h.
$G = 1.00$
$Qa = 70$ gallons per acre output desired $$Pn = 2.83 \left( \frac{70 \times 10 \times 660}{440} \right)^2 \times 1.00 \times 10^{-5} = 31.2 \text{ p.s.i.} \quad \text{III}$$

VIII
$Pc = 1.448 \times I^m \times Pn^{(1-X)} = 1.448 \times (440)^m \times 31.2^{(1-X)}$ $X = .0652 \times (440)^{.000145 \times 440} = .0652(440)^{.0638} =$  V
$.096$
$(1 - X) = (1.00 - .096) = .9038$
$m = .0000037(440)^{1.5} = .0341$ VII
$Pc = 1.448(440)^{.0341} \times 31.2^{.9038} = 1.448 \times 1.231 \times 22.41 = 39.9$ p.s.i.

From the plot of the test data, FIG. 3, for $I=440$, at $Pn=31.2$ p.s.i., $R=Pc/PN=1.28$
$Pc=1.28\times31.2=39.9$, which is the same pressure calculated for Pc from equation VIII.

It thus will be seen that the objects of this invention have been fully and effectively accomplished. It will be realized, however, that the specific embodiment shown and described is susceptible to modification without departure from the principles of the invention. Hence, the invention encompasses all modifications within the spirit and scope of the following claims.

I claim:

1. In a system for applying liquid agricultural chemicals to the soil from driver-operated self-propelled moving vehicle means at a substantially constant preselected rate, in amount per unit area, substantially independent of vehicle speed, the combination comprising:
   centrifugal pump means of the type having its outlet pressure substantially proportional to the square of its speed, for receiving liquid from a source of supply and delivering it to liquid discharge orifice means for applying the liquid to the soil, flow through said orifice means being substantially proportional to the square root of the pressure of liquid delivered thereto;
   means for driving said pump means at a rate substantially directly proportional to vehicle means speed;
   a delivery line connected to the outlet of said pump means;
   a shut-off valve in said delivery line;
   first means controllable by the vehicle means driver for operating said shut-off valve;
   a by-pass line connected to the outlet of said pump means for returning liquid to the source of supply;
   adjustable orifice means in said by-pass line for controlling upstream of said adjustable orifice means;
   second means controllable by the driver while the vehicle means is moving for adjusting said adjustable orifice means;
   and a pressure gauge readable by the driver while the vehicle means is moving and connected to said lines upstream of said valve and said adjustable orifice means;
   whereby the driver can select an application rate, predetermined a pressure upstream of said valve when the latter is closed and when the vehicle means is moving at a predetermined speed with said pump means being driven which will result in the selected application rate when said valve is opened, close said valve, operate the vehicle means to move at the predetermined speed with said pump means being driven while the vehicle means is so moving, adjust said adjustable orifice means to attain said predetermined pressure in said lines upstream of said valve while the latter is closed, and then open said valve to apply liquid at the selected rate substantially independent of vehicle means speed.

2. The system defined in claim 1 including another pressure gauge readable by the driver while the vehicle means is moving and connected to the delivery line adjacent the discharge orifice means for measuring the pressure of liquid delivered thereto.

3. The system defined in claim 1 including pressure-responsive signalling means which can be sensed by the driver while the vehicle means is moving and connected to the delivery lines adjacent the discharge orifice means for indicating when the pressure of liquid delivered thereto is below a predetermined pressure.

4. The system defined in claim 1 in which the second controllable means includes a reversible electric motor and a reversing switch therefor.

5. The system defined in claim 1 including electric lamp signalling means usable by the driver and responding to the position of the shut-off valve for indicating when said shut-off valve is fully open.

6. The system defined in claim 1 including electric lamp signalling means visible by the driver and responsive to the position of the shut-off valve for indicating when said shut-off valve is closed.

7. A system for applying liquid agricultural chemicals to the soil from a moving vehicle at a substantially constant preselected rate, in amount per unit area, substantially independent of vehicle speed, the combination comprising:

driver-operated self-propelled wheeled vehicle means;

a supply tank for the chemicals operatively associated and movable with said vehicle means;

liquid discharge orifice means operatively associated and movable with said vehicle means for applying liquid to the soil, flow through said discharge orifice means being substantially proportional to the square root of the pressure of the liquid delivered thereto;

centrifugal pump means of the type having its outlet pressure substantially proportional to the square of its speed operatively associated and movable with said vehicle means for receiving liquid from said tank and delivering it to said liquid discharge orifice means;

means for driving said pump means at a rate substantially directly proportional to the speed of said vehicle means;

a suction line connected between said tank and the inlet of said pump means;

a delivery line connected between the outlet of said pump means and said orifice means;

a shut-off valve in said delivery line;

first means controllable by the vehicle means driver for operating said shut-off valve;

a by-pass line connected between the outlet of said pump means and said tank;

adjustable orifice means in said by-pass line for controlling pressure upstream of said adjustable orifice means;

second means controllable by the driver while the vehicle means is moving for adjusting said adjustable orifice means; and a pressure gauge readable by the driver while the vehicle means is moving and connected to said lines upstream of said valve and said adjustable orifice means;

whereby the driver can select an application rate, predetermine a pressure upstream of said valve when the latter is closed and when said vehicle means is moving at a predetermined speed with said pump means being driven which will result in the selected application rate when said valve is opened, close said valve, operate said vehicle means to move at the predetermined speed with said pump means being driven while said vehicle means is so moving, adjust said adjustable orifice means to attain said predetermined pressure in said lines upstream of said valve while the latter is closed, and then open said valve to apply liquid at the selected rate substantially independent of vehicle means speed.

8. The system defined in claim 7 including another pressure gauge readable by the operator while the vehicle means is moving and connected to the delivery line adjacent the discharge orifice means for measuring the pressure of liquid delivered thereto.

9. The system defined in claim 7 including signalling means which can be sensed by the driver while said vehicle means is moving and connected to the delivery line adjacent the discharge orifice means for indicating when the pressure of liquid delivered thereto is below a predetermined pressure.

10. The system defined in claim 7 in which the second controllable means includes a reversible electric motor and a reversing switch therefor.

11. The system defined in claim 7 including electric lamp signalling means visible by the driver and responsive to the position of the shut-off valve for indicating when said shut-off valve is fully open.

12. The system defined in claim 7 including electric lamp signalling means visible by the driver and responsive to the position of the shut-off valve for indicating when said valve is closed.

13. A method for setting a selected rate of application, in amount per unit area, in a system for applying liquid agricultural chemicals to the soil from driver-operated self-propelled moving vehicle means which includes a supply tank, liquid discharge orifice means for applying liquid to the soil, centrifugal pump means of the type having its outlet pressure substantially proportional to the square of its speed, means for driving the pump means at a rate substantially proportional to vehicle means speed, a suction line connected between the tank and the pump means inlet, a delivery line connected between the pump means outlet and the discharge orifice means, a by-pass line connected between the pump means outlet and the tank, a shut-off valve in the delivery line, and adjustable orifice means in the by-pass line for controlling pressure upstream of the adjustable orifice means, the steps comprising:

determining a pressure upstream of the valve when the latter is closed and while the vehicle means is moving at a predetermined speed with the pump means being driven which will result in the selected application rate when the valve is opened;

moving the vehicle means at the predetermined speed with the pump means being driven and the valve closed;

while the vehicle means is moving at the predetermined speed and the pump means is being driven with the valve closed, adjusting the adjustable orifice means to attain the determined pressure upstream thereof;

opening the valve; and moving the vehicle means at substantially any speed with the pump means being driven to apply liquid to the soil at the selected application rate.

14. The method defined in claim 13 including the steps, replacing the determining step, of:

determining the pressure on the orifice means necessary for achieving the selected application rate while the vehicle means is moving at a predetermined speed with the pump means being driven and the valve is open, and determining a pressure upstream of the valve when the latter is closed and while the vehicle means is moving at the predetermined speed with the pump means being driven which will result in the determined pressure on the orifice means when the valve is opened.

15. The method defined in claim 14 including the additional step, following the valve opening step, of further adjusting the adjustable orifice means, if necessary, to attain the determined pressure on the orifice means.

16. The method defined in claim 13 wherein the determined pressure is a function of (1) number of discharge orifices in the liquid discharge orifice means, (2) size of each discharge orifice, (3) swath width of the discharge orifice means, (4) specific gravity of the liquid, (5) the predetermined speed and (6) the application rate.

* * * * *